(12) United States Patent
Naito et al.

(10) Patent No.: US 11,050,937 B2
(45) Date of Patent: Jun. 29, 2021

(54) IMAGE STABILIZING APPARATUS, OPTICAL APPARATUS HAVING THE SAME, AND IMAGE STABILIZING METHOD

(71) Applicant: CANON KABUSHIKI KAISHA, Tokyo (JP)

(72) Inventors: Go Naito, Kawasaki (JP); Koichi Washisu, Tokyo (JP); Kenji Takeuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/001,830

(22) Filed: Aug. 25, 2020

(65) Prior Publication Data

US 2021/0067698 A1 Mar. 4, 2021

(30) Foreign Application Priority Data

Aug. 27, 2019 (JP) .............................. JP2019-154583

(51) Int. Cl.
*H04N 5/232* (2006.01)

(52) U.S. Cl.
CPC ..... *H04N 5/23267* (2013.01); *H04N 5/23258* (2013.01)

(58) Field of Classification Search
None
See application file for complete search history.

(56) References Cited

U.S. PATENT DOCUMENTS

| 9,031,396 B2* | 5/2015 | Wakamatsu | G02B 27/646 396/55 |
| 2015/0036007 A1* | 2/2015 | Wakamatsu | H04N 5/23258 348/208.2 |
| 2015/0062358 A1* | 3/2015 | Takeuchi | H04N 5/2328 348/208.1 |
| 2017/0134659 A1* | 5/2017 | Miyahara | H04N 5/23254 |
| 2018/0213155 A1* | 7/2018 | Takayanagi | H04N 5/23251 |

FOREIGN PATENT DOCUMENTS

JP 2010-112974 A 5/2010

* cited by examiner

*Primary Examiner* — James M Hannett
(74) *Attorney, Agent, or Firm* — Cowan, Liebowitz & Latman, P.C.

(57) ABSTRACT

An image stabilizing apparatus includes at least one processor or circuit configured to execute a plurality of tasks including a first calculation task configured to make a calculation using an output signal from a shake detector configured to detect a shake, a second calculation task configured to estimate an estimated value corresponding to an offset variation value included in the output signal from the shake detector by using a signal processed by a low-pass filter having a high-frequency attenuation characteristic steeper than a high-frequency attenuation characteristic of the first calculation task, and a correction task configured to drive a corrector configured to correct an image blur caused by the shake using a calculation result of the first calculation task and the estimated value.

11 Claims, 15 Drawing Sheets

IMAGE STABILIZING APPARATUS, OPTICAL APPARATUS HAVING THE SAME, AND IMAGE STABILIZING METHOD

BACKGROUND OF THE INVENTION

Field of the Invention

The present invention relates to an image stabilizing apparatus, an optical apparatus having the same, and an image stabilizing method.

Description of the Related Art

In an image pickup apparatus that performs an image stabilization using an output signal of a shake (or vibration) detector that detects vibrations (camera shakes), the output signal from the shake detector suffers from an offset variation (or fluctuation) when the temperature rises after the power is turned on, and the image stabilization performance may deteriorate. Japanese Patent Laid-Open No. ("JP") 2010-112974 discloses an image stabilizing apparatus that changes a characteristic of a filter that filters a specific frequency component of the output signal of the shake detector in accordance with a temperature changing rate of the shake detector or its peripherals in order to reduce the offset variation in the output signal from the shake detector.

However, the image stabilizing apparatus disclosed in JP 2010-112974 changes the processing characteristic for the output signal from the shake detector, and thus may not sufficiently correct image blurs, for example, where the frequency component of the shake is included in the frequency component filtered by the filter.

SUMMARY OF THE INVENTION

The present invention provides an image stabilizing apparatus, an optical apparatus having the same, and an image stabilizing method, each of which can correct image blurs with high accuracy and reduce offset variation in an output signal from a shake detector,.

An image stabilizing apparatus according to one aspect of the present invention includes at least one processor or circuit configured to execute a plurality of tasks including a first calculation task configured to make a calculation using an output signal from a shake detector configured to detect a shake, a second calculation task configured to estimate an estimated value corresponding to an offset variation value included in the output signal from the shake detector by using a signal processed by a low-pass filter having a high-frequency attenuation characteristic steeper than a high-frequency attenuation characteristic of the first calculation task, and a correction task configured to drive a corrector configured to correct an image blur caused by the shake using a calculation result of the first calculation task and the estimated value.

An optical apparatus having the above image stabilizing apparatus and an image stabilizing method corresponding to the image stabilizing apparatus also constitute another aspect of the present invention.

Further features of the present invention will become apparent from the following description of exemplary embodiments with reference to the attached drawings.

DESCRIPTION OF THE EMBODIMENTS

Figure 1:
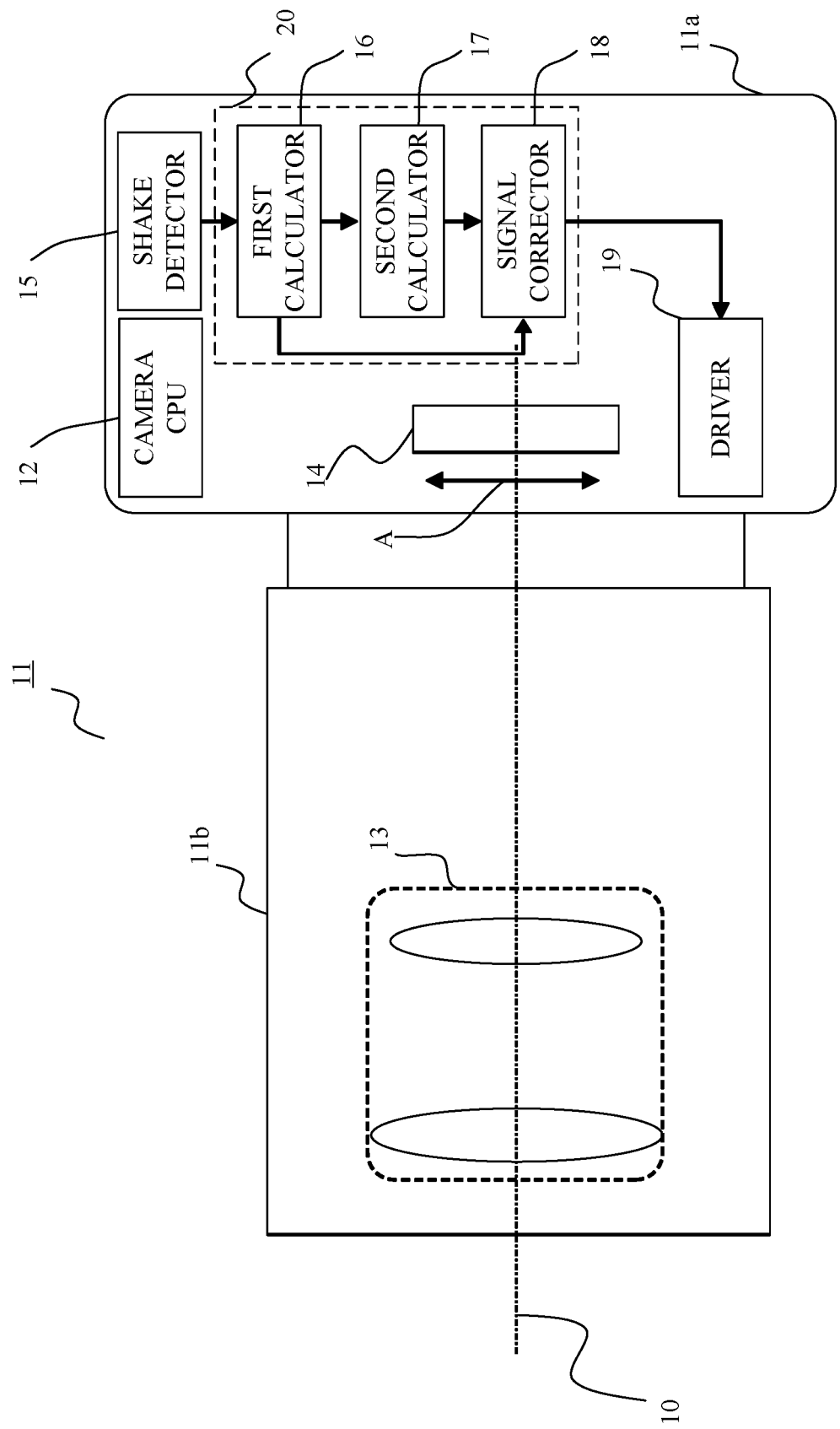
FIG. 1 is a block diagram of an optical apparatus according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

FIG. 1 is a block diagram of a digital camera 11 which is an example of an optical apparatus according to this embodiment. The digital camera 11 includes a camera body 11a, and an interchangeable lens 11b that can be attached to and detached from the camera body 11a. The camera body 11a includes a camera CPU 12, an image sensor (corrector) 14, a shake detector 15, a first calculator (first calculation task) 16, a second calculator (second calculation task) 17, a signal corrector (correction task) 18, and a driver 19. In this embodiment, the image stabilizing apparatus 20 includes the first calculator 16, the second calculator 17, and the signal corrector 18. The interchangeable lens 11b has an imaging optical system 13. This embodiment describes a digital camera as an example of an optical apparatus equipped with an image stabilizing apparatus, but the present invention is not limited to this embodiment. The image stabilizing apparatus may be mounted on another optical apparatus, such as the digital video camera or the interchangeable lens.

The camera CPU 12 controls the entire camera body 11a in response to an imaging instruction operation from the photographer, etc.

When an object light flux along an optical axis 10 enters the image sensor 14 through the imaging optical system 13, the image sensor 14 outputs a signal in response to the object light flux. The signal output from the image sensor 14 undergoes image processing by an unillustrated image processor, and the obtained image information is recorded in an unillustrated memory.

The image sensor 14 is driven in an arrow A direction orthogonal to the optical axis 10 and configured to correct image blurs caused on the imaging surface of the image sensor 14 due to the blurs (shakes) applied to the digital camera 11.

Figure 2:
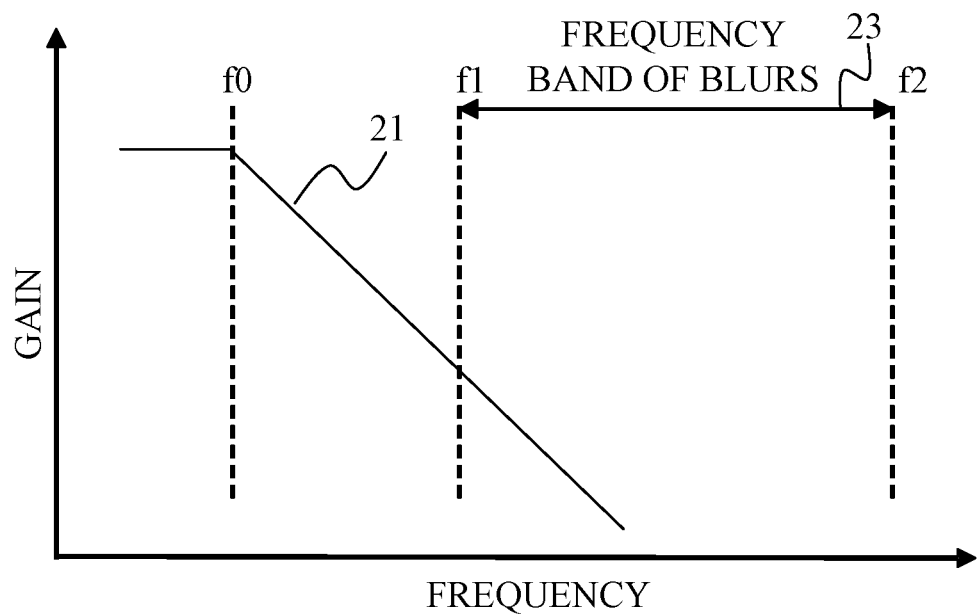
FIG. 2 is a Bode diagram of an integral characteristic in a first calculator according to the first embodiment.

The shake detector 15 is an angular velocity sensor, and detects the blur or shake applied to the digital camera 11. The first calculator 16 converts the blur angular velocity signal output from the shake detector 15 into a blur angle signal through the first-order integral. Referring now to FIG. 2, a description will be given of an integral characteristic in the first calculator 16. FIG. 2 is a Bode diagram of the integral characteristic in the first calculator 16. In FIG. 2, the abscissa axis represents the frequency and the ordinate axis represents an output gain in the first calculator 16.

On the high-frequency side of a break frequency f0 which is an integral start frequency in the integral characteristic 21, the output gain uses the angle signal calculated from the angular velocity signal from the shake detector 15 by the first calculator 16, and is inversely proportional to the frequency.

Due to the low calculation accuracy using a signal near the break frequency f0, the break frequency f0 is set sufficiently far from the signal in the frequency band to be actually integrated. For example, when the frequency band 23 of the blurs to be detected distributes between a frequency f1 and a frequency f2 (such as 1 Hz to 10 Hz), a break frequency f0 (such as 0.01 Hz) much lower than the frequency (lower limit frequency) f1 on the low-frequency side of the frequency band 23 of the blurs is set.

Figure 3:
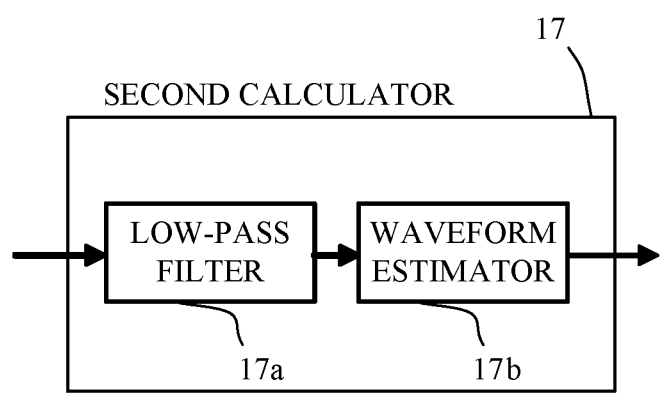
FIG. 3 is a block diagram of a second calculator according to the first embodiment.
Figure 4:
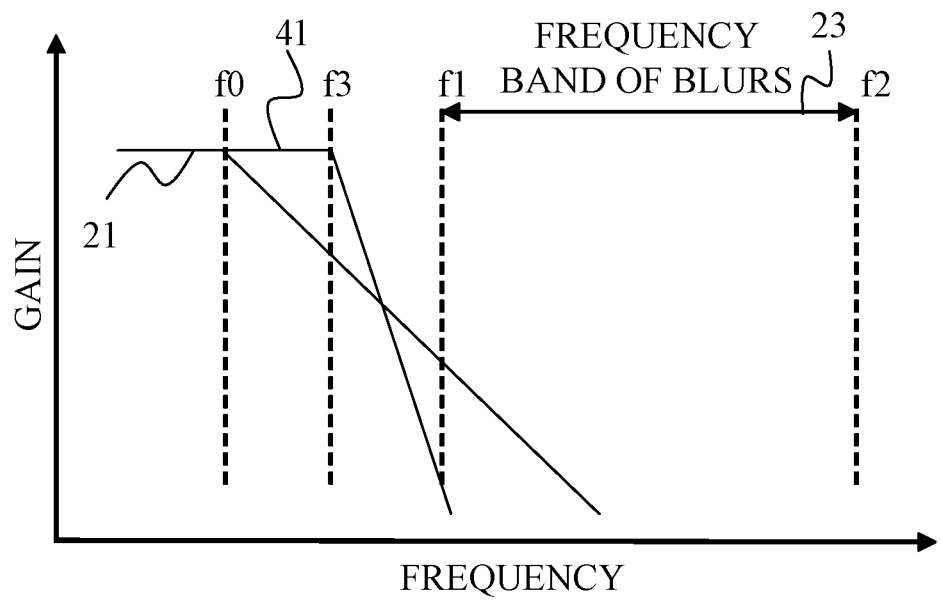
FIG. 4 is a Bode diagram of an offset extraction characteristic in a low-pass filter according to the first embodiment.

FIG. 3 is a block diagram of the second calculator 17. The second calculator 17 includes a low-pass filter 17a having a high-frequency attenuation characteristic that is steeper than that of the integral characteristic 21, and a waveform estimator 17b. Referring now to FIG. 4, a description will be given of an offset extraction characteristic of the low-pass filter 17a. FIG. 4 is a Bode diagram of the offset extraction characteristic of the low-pass filter 17a. In FIG. 4, the abscissa axis represents the frequency, and the ordinate axis represents the output gain in the second calculator 17.

The offset extraction characteristic 41 is a high-frequency attenuation characteristic (such as a fourth-order integral characteristic) that is steeper than the integral characteristic 21 of the first calculator 16 on the high-frequency side of a break frequency f3 that is the offset extraction frequency. In this embodiment, the low-pass filter 17a representing a steep high-frequency attenuation characteristic is expressed as a low-pass filter having an order higher than that of the first calculator 16.

In this embodiment, the signal on the high-frequency side of the output signal from the first calculator 16 is attenuated by the second calculator 17, and only the signal on the low-frequency side which is an offset variation value of the shake detector 15 is extracted.

The break frequency f3 is set between the break frequency f0 and the frequency f1 on the low-frequency side of the frequency band of the blurs. By setting the break frequency f3 to a frequency higher than the break frequency f0, the low-frequency offset variation value included in the output signal of the shake detector 15 is not attenuated. The break frequency f3 is lower than the frequency f1 on the low-frequency side of the frequency band 23 of the blurs, and a high order, so that the blurred signal is sufficiently attenuated.

Figure 5:
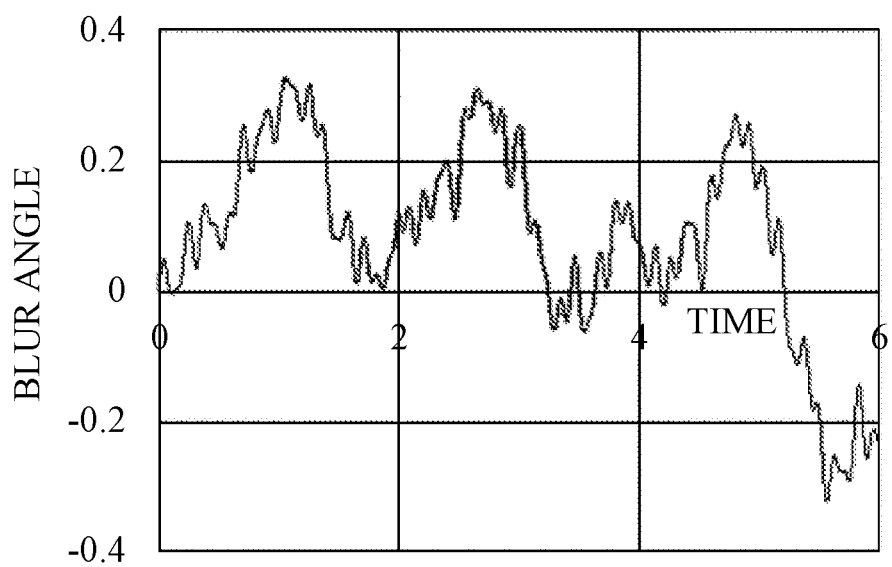
FIG. 5 illustrates a blur angle signal when the offset varies in the first embodiment.

FIG. 5 illustrates a blur angle signal when the offset varies. In FIG. 5, the abscissa axis represents time, and the ordinate axis represents a blur angle calculated by the first calculator 16 using the blur angular velocity signal output from the shake detector 15.

Figure 6:
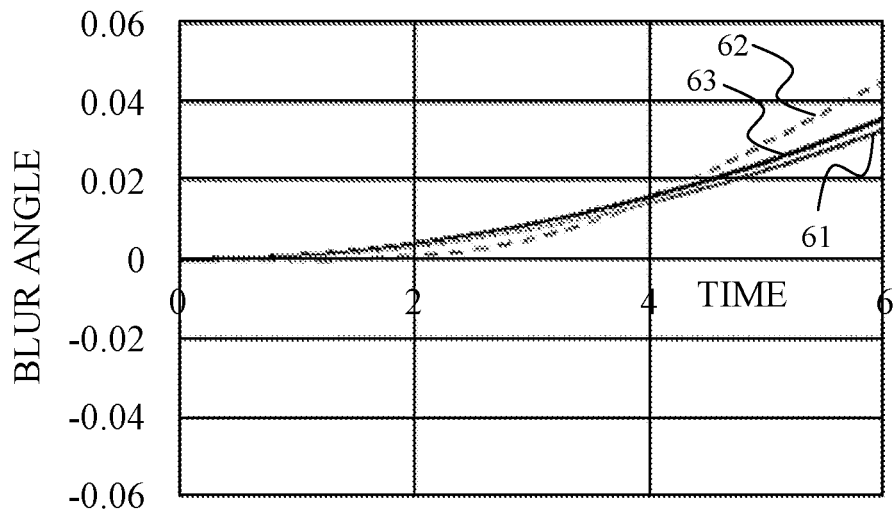
FIG. 6 illustrates a value obtained by converting the offset variation value into a blur angle according to the first embodiment.

FIG. 6 illustrates a value obtained by converting the offset variation value into a blur angle. In FIG. 6, the abscissa axis represents time, and the ordinate axis represents a value obtained by converting the offset variation value into the blur angle. A signal 61 represents a value corresponding to the actual offset variation value included in the blur angle signal in FIG. 5. A signal 62 represents a signal after the blur angle signal in FIG. 5 is processed by the low-pass filter 17a. A signal 63 represents an estimated value corresponding to the offset variation value estimated by the waveform estimator 17b using the signal 62.

The waveform estimator 17b estimates and updates the estimated value corresponding to the offset variation value of the signal 62 at a timing when the same time as the exposure time passes. In this embodiment, this operation by the waveform estimator 17b will be referred to as offset estimation, and the time (timing) for making the offset estimation will be referred to as offset estimation time. For example, when the exposure time in still image capturing is ¹⁄₁₅ seconds, the slope of the signal 62 is calculated every ¹⁄₁₅ seconds. In other words, the offset estimation estimated offset time is set according to the exposure time.

The offset variation value included in the output signal of the shake detector 15 is large when the shake detector 15 starts or runs, and becomes small over time. Thus, the waveform estimator 17b gives the largest gain to the slope of the signal 62 when the offset estimation starts, and reduces the gain given to the slope of the signal 62 over time. In other words, the waveform estimator 17b changes the offset estimating method.

Figure 7:
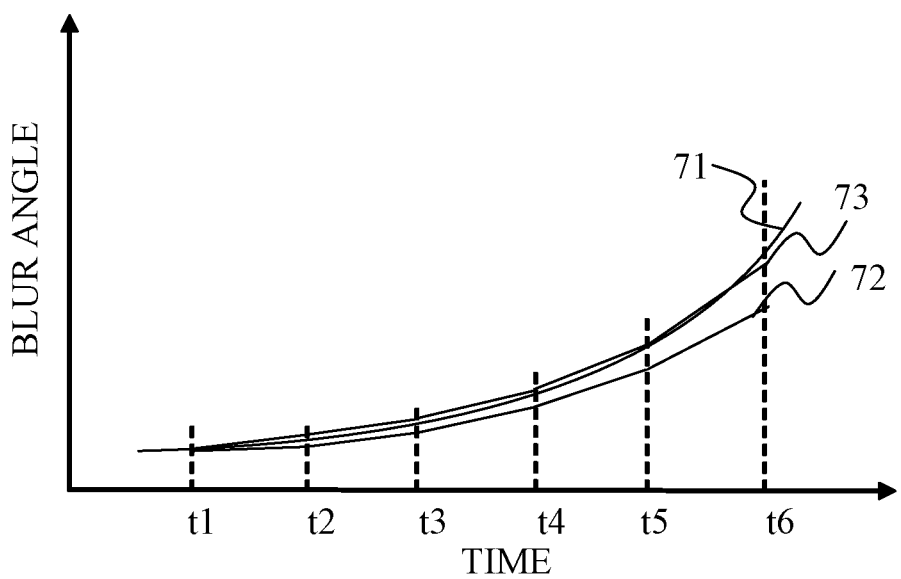
FIG. 7 is an operation explanatory diagram of a waveform estimator according to the first embodiment.

FIG. 7 is an operation explanatory diagram of the waveform estimator 17b when the exposure time is set to ¹⁄₁₅ seconds. In FIG. 7, the abscissa axis represents time, and the ordinate axis represents the value obtained by converting the offset variation value into the blur angle. A signal 72 represents a signal obtained by continuously connecting the slope of a signal 71 (the signal 62 in FIG. 6) after the blur angle signal is processed by the low-pass filter 17a every ¹⁄₁₅ seconds from time t1 to time t6. A signal 73 represents a signal obtained by continuously connecting a signal calculated using the slope of the signal 71 every 15 seconds, when the gain given to the slope of the signal 71 is made smaller over time (so that the largest gain is given to the slope at the time t1). The signal 73 is closer to the signal 71 than the signal 72. In other words, by changing (decreasing) the gain over time, the estimated value corresponding to the offset variation value included in the output signal from the shake detector 15 can be estimated with high accuracy.

The signal corrector 18 subtracts the estimated value indicated by the signal 63 in FIG. 6 from the output signal from the first calculator 16, and drives the image sensor 14 via the driver 19 by setting the result to the target value for the image stabilization.

The signal 62, which is the signal after the blur angle signal is processed by the low-pass filter 17a, includes a phase shift caused by the low-pass filter 17a. When the signal 62 is directly used to correct the output signal of the first calculator 16, the output signal from the first calculator 16 deteriorates. Accordingly, this embodiment does not correct the output signal from the first calculator 16 directly using the signal 62.

Figure 8:
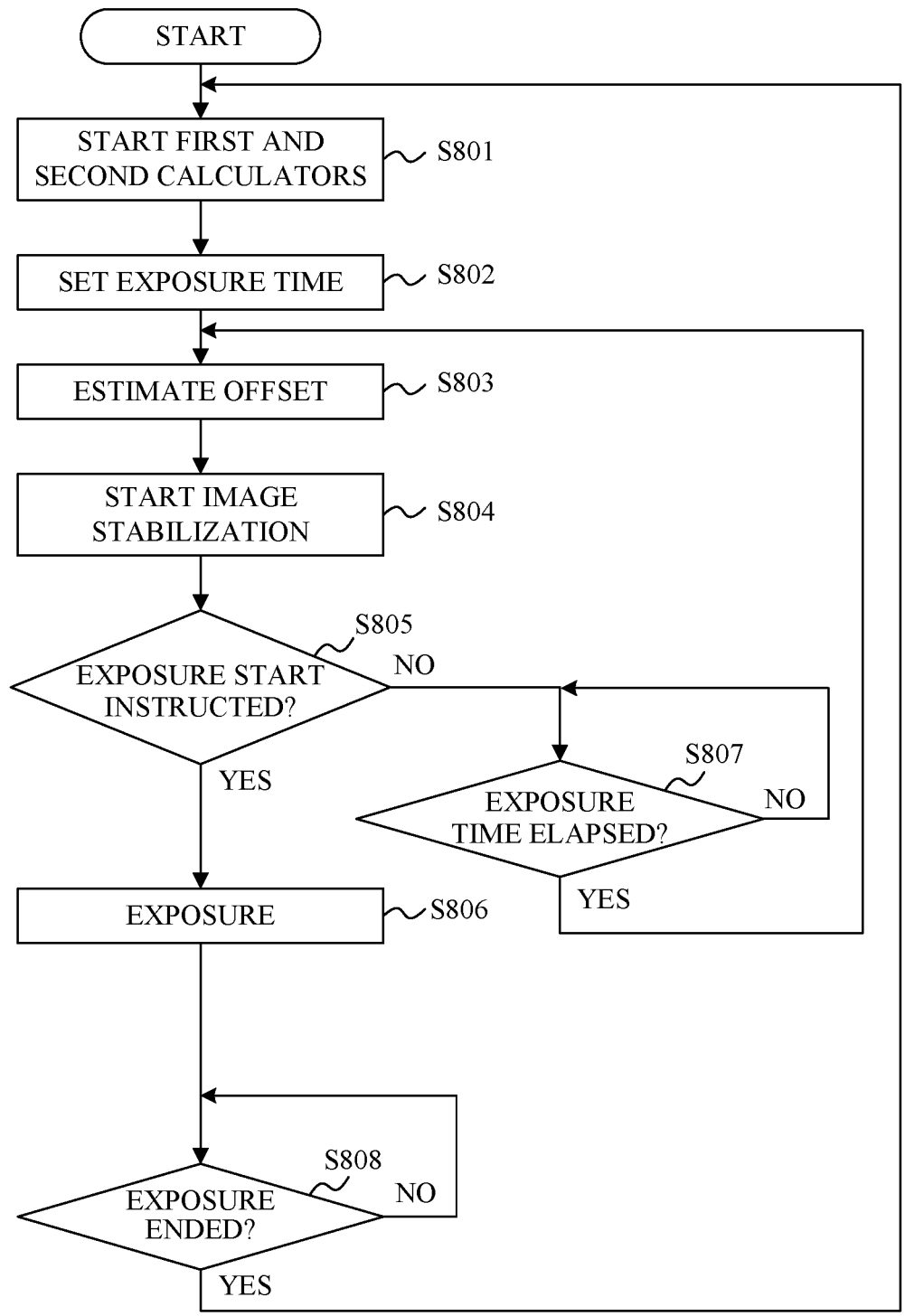
FIG. 8 is a flowchart showing processing of estimating an estimated value corresponding to the offset variation value according to the first embodiment.

FIG. 8 is a flowchart showing processing of estimating the estimated value corresponding to the offset variation value. This flow starts with imaging preparation processing such as half-pressing a release switch provided on the camera body 11a.

In the step S801, the camera CPU 12 starts the first calculator 16 and the second calculator 17.

In the step S802, the camera CPU 12 sets the exposure time used for imaging according to the input of the photographer, etc.

In the step S803, the waveform estimator 17b estimates an estimated value corresponding to the offset variation value using the signal processed by the low-pass filter 17a and the offset estimation time determined from the exposure time.

In the step S804, the signal corrector 18 drives the image sensor 14 via the driver 19 using the result of subtracting the estimated value estimated in the step S802 from the output signal (calculation result) from the first calculator 16, and starts the image blur correction.

In the step S805, the camera CPU determines whether or not the start of the still image exposure has been instructed. When the exposure start is instructed, the flow proceeds to the step S806, and when the exposure start has not yet been instructed, the flow proceeds to the step S807.

In the step S806, the camera CPU 12 performs an operation such as opening a shutter provided on the camera body 11a to expose a still image.

In the step S807, the camera CPU 12 determines whether or not the exposure time (such as 1/15 seconds) set in the step S801 has elapsed. If the exposure time has elapsed, the flow returns to the step S803. In other words, the offset is estimated for each exposure time. If the exposure time has not yet elapsed, the processing of this step is repeated. The image stabilization continues regardless of the processing of this step.

In the step S808, the camera CPU 12 determines whether or not the exposure has been completed. If the exposure has been completed, the flow returns to the step S801. If the exposure has not yet been completed, the processing of this step is repeated.

In this embodiment, the second calculator 17 extracts only the value corresponding to the offset variation value in which the blurs are sufficiently removed from the output signal of the first calculator 16 by the low-pass filter 17a. In addition, the waveform estimator 17b discards the phase information included in the extracted value, and changes the offset estimating method over time to estimate an accurate estimated value corresponding to the offset variation value. The signal corrector 18 removes the estimated value corresponding to the offset variation value included in the output signal from the first calculator 16 without changing the characteristic of the output signal of the first calculator 16.

As described above, the configuration according to this embodiment can correct the image blur with high accuracy, and reduce the offset variation in the output signal from the shake detector.

Second Embodiment

This embodiment reduces the order of the low-pass filter when the elapsed time after the second calculator starts is short and increases the order of the low-pass filter over time, in order to reproduce the time change in the offset variation in the output signal from the shake detector.

Figure 9:
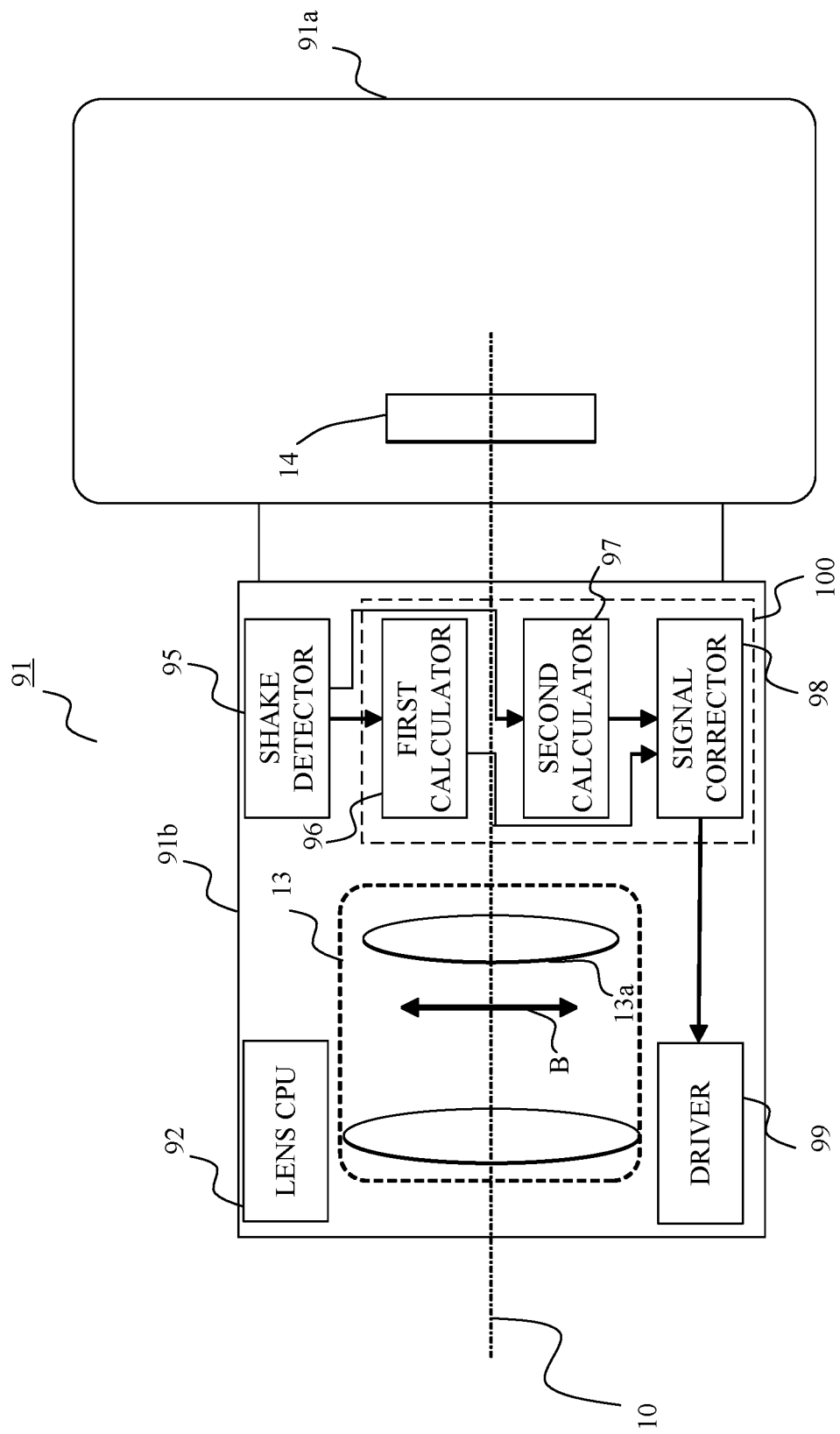
FIG. 9 is a block diagram of an optical apparatus according to a second embodiment.

FIG. 9 is a block diagram of a digital camera 91 which is an example of the optical apparatus according to this embodiment. The digital camera 91 includes a camera body 91a, and an interchangeable lens 91b that can be attached to and detached from the camera body 91a. The camera body 91a includes the image sensor 14. The interchangeable lens 91b includes the imaging optical system 13, a lens CPU 92, a shake detector 95, a first calculator (first calculation task) 96, a second calculator (second calculation task) 97, a signal corrector (correction task) 98, and a driver 99. In this embodiment, the image stabilizing apparatus 100 includes the first calculator 96, the second calculator 97, and the signal corrector 98. The second calculator 97 has a low-pass filter 97a and a waveform estimator 97b.

The lens CPU 92 controls the entire interchangeable lens 11b in response to the imaging instruction operation from the photographer.

Part of the lens of the imaging optical system 13 serves as a corrector driven in an arrow B direction orthogonal to the optical axis 10 and configured to correct image blurs caused on the imaging plane of the image sensor 14 by a blur (shake) applied to the digital camera 91.

In this embodiment, the shake detector 95 directly transmits the blur angular velocity signal to the second calculator 97 without intervening the first calculator 96, and the first calculator 96 does not transmit the blur angle signal to the second calculator 97.

The second calculator 97 has a low-pass filter 97a having an order higher than that of the integral characteristic of the first calculator 96. The break frequency, which is the offset extraction frequency, is f3, similar to the first embodiment. Although the order of the low-pass filter 97a is fixed in the first embodiment, it increases over time after the second calculator 97 starts in this embodiment.

Figure 10:
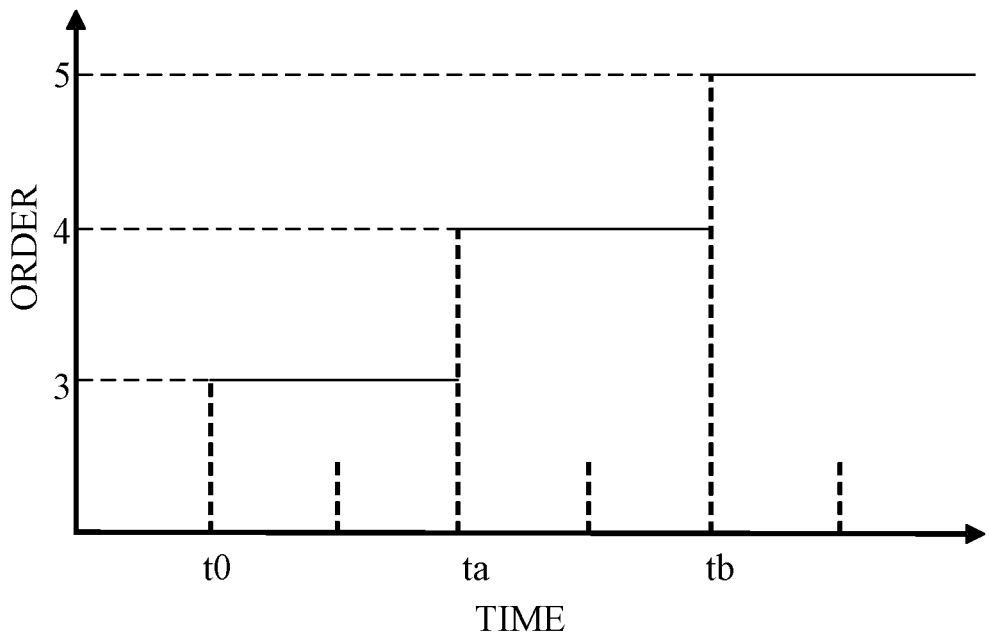
FIG. 10 explains the order of the low-pass filter according to the second embodiment.

FIG. 10 explains the order of the low-pass filter 97a, and illustrates that the order of the low-pass filter 97a changes over time after the second calculator 97 starts. In FIG. 10, the abscissa axis represents time and the ordinate axis represents the order. From start time t0 of the second calculator 97 to first time ta (such as 2 seconds), the order is set to 3 (corresponding to the third-order integral). From the first time ta to second time tb (such as 4 seconds), the order is set to 4 (corresponding to fourth-order integral). After the second time tb, the order is set to 5 (corresponding to fifth-order integral).

Figure 11:
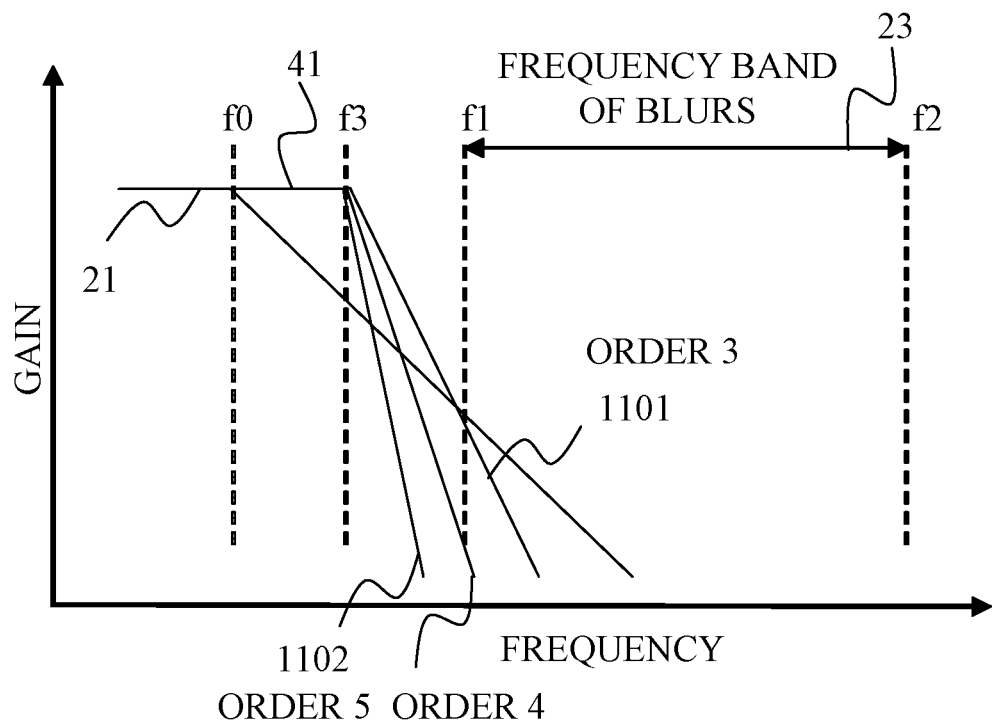
FIG. 11 explains a characteristic of the low-pass filter according to the second embodiment.

FIG. 11 explains the characteristic of the low-pass filter 97a for each order. In FIG. 11, the abscissa axis represents the frequency and the ordinate axis represents the output gain in the second calculator 17. A characteristic 1101 with the order of 3 and a characteristic 1102 with the order of 5 are different in blur attenuation amount distributed in the frequency band 23 of the blurs (slopes of the characteristics 1101 and 1102 in the frequency band 23 of the blurs). The blur attenuation amount in the characteristic 1102 is larger than the blur attenuation amount in the characteristic 1101. In other words, the slope of the characteristic 1102 is larger than the slope of the characteristic 1102. Hence, the estimated value corresponding to the offset variation value when the frequency is high cannot be extracted well. In other words, the extraction accuracy of the estimated value corresponding to the offset variation value in a short time is low. On the other hand, the estimated value corresponding to the offset variation value can be extracted well when the frequency is low. In other words, the extraction accuracy of the estimated value corresponding to the offset variation value for a long time is high.

The offset variation value included in the output signal from the shake detector 95 changes to the low frequency side over time after the shake detector 95 starts. This embodiment increases over time, after the shake detector 95 starts, the order of the low-pass filter 97a in the second calculator 97 that starts substantially as soon as the shake detector 95 starts, in order to improve the extraction accuracy of the estimated value corresponding to the offset variation value.

Figure 12:
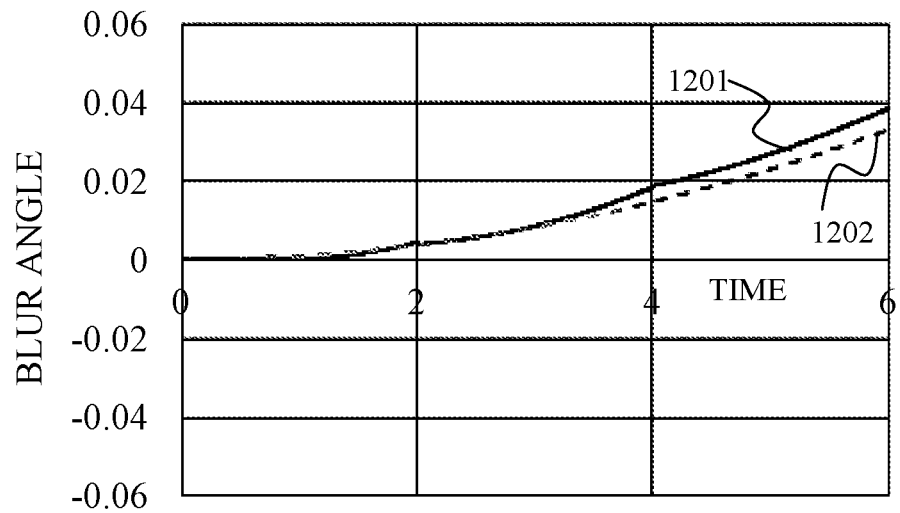
FIG. 12 illustrates a value corresponding to an extracted offset variation value according to the second embodiment.
Figure 13:
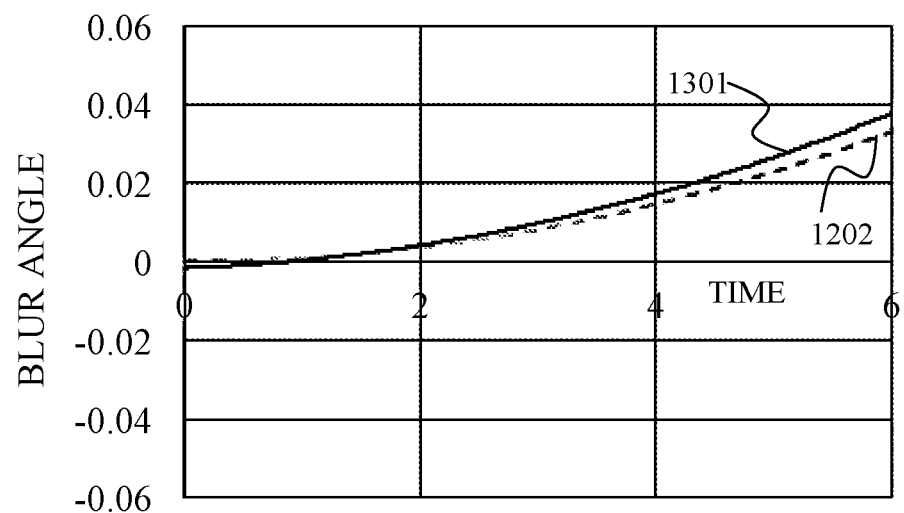
FIG. 13 illustrates an estimated value corresponding to an estimated offset variation value according to the second embodiment.

FIG. 12 illustrates a value corresponding to the offset variation value included in the output signal from the shake detector 95, which is extracted by changing the order of the low-pass filter 97a over time and by performing processing for maintaining the continuity before and after the change. An extracted value 1201 has a shape close to a value 1202 corresponding to the offset variation value included in the actual output signal from the shake detector 95. As illustrated in FIG. 13, the waveform estimator 97b estimates an estimated value 1301 corresponding to the offset variation value during exposure using the extracted estimated value 1201.

The signal corrector 98 subtracts the estimated value 1301 from the output signal from the first calculator 96, and drives the corrector 13a via the driver 99 using the result as a target value for the image stabilization.

Figure 14:
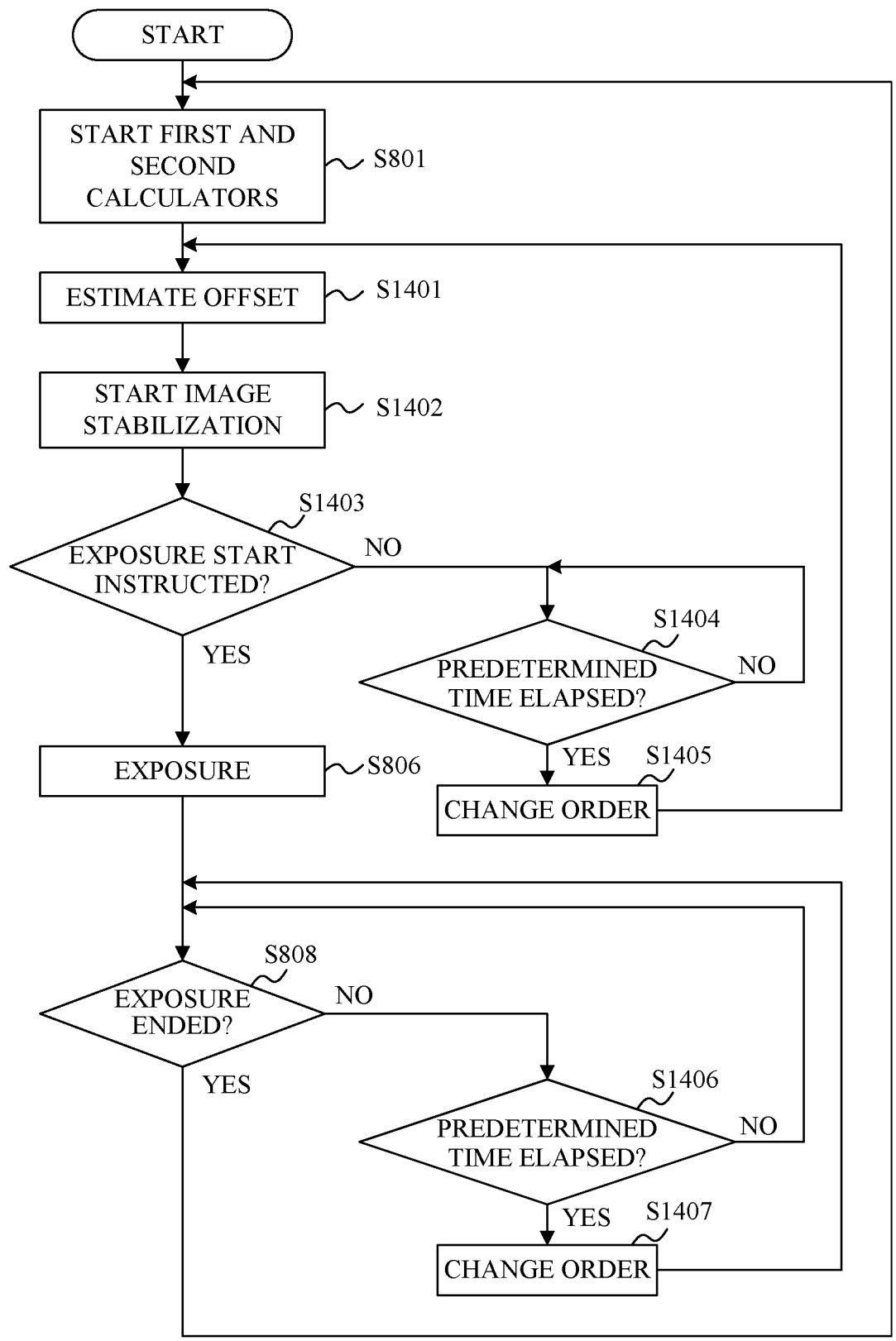
FIG. 14 is a flowchart showing processing of estimating an estimated value corresponding to an offset variation value according to the second embodiment.

FIG. 14 is a flowchart showing processing of estimating an estimated value corresponding to the offset variation value. This flow starts with the imaging preparation processing such as half-pressing the release switch provided on the camera body 11a. In FIG. 14, the steps for performing the same processing as those in the flow in FIG. 8 will be designated by the same reference numerals, and a detailed description thereof will be omitted.

In the step S1401, the waveform estimator 97b estimates an estimated value corresponding to the offset variation value using the signal processed by the low-pass filter 97a.

In the step S1402, the signal corrector 98 drives the corrector 13a (to start the image stabilization) via the driver 99 using the result of subtracting the estimated value estimated in the step S1401 from the output signal from the first calculator 96.

In the step S1403, the lens CPU 92 determines whether or not the digital camera 91 has been instructed to start exposing a still image. When the exposure start is instructed, the flow proceeds to the step S806, and when the exposure start has not yet been instructed, the flow proceeds to step S1404.

In the step S1404, the lens CPU 92 determines whether a predetermined time (such as the times ta and tb in FIG. 10) has elapsed. If the predetermined time has elapsed, the flow proceeds to the step S1405, and if the predetermined time has not yet elapsed, the processing of this step is repeated.

In the step S1405, the second calculator 97 changes (increases) the order of the low-pass filter 97a.

In the step S1406, the lens CPU 92 determines whether a predetermined time (such as the times ta and tb in FIG. 10) has elapsed. When the predetermined time has elapsed, the flow proceeds to the step S1406, and when the predetermined time has not yet elapsed, the flow returns to the step S808.

In the step S1407, the second calculator 97 changes (increases) the order of the low-pass filter 97a.

This embodiment can improve the estimation accuracy of the estimated value corresponding to the offset variation value included in the output signal of the shake detector 95 by changing the order of the low-pass filter 97a over time after the second calculator 97 starts.

As described above, the configuration according to this embodiment can correct the image blurs with high accuracy, and reduce the offset variation in the output signal from the shake detector.

In this embodiment, the interchangeable lens 91b includes the shake detector 95, the first calculator 96, the second calculator 97, the signal corrector 98, and the driver 99, but the camera body 91a may include them.

Third Embodiment

This embodiment changes, over time after the second calculator starts (increases the time constant), the break frequency of the low-pass filter to the low-frequency side, in order to reproduce the time change of the offset variation in the output signal from the shake detector.

Figure 15:
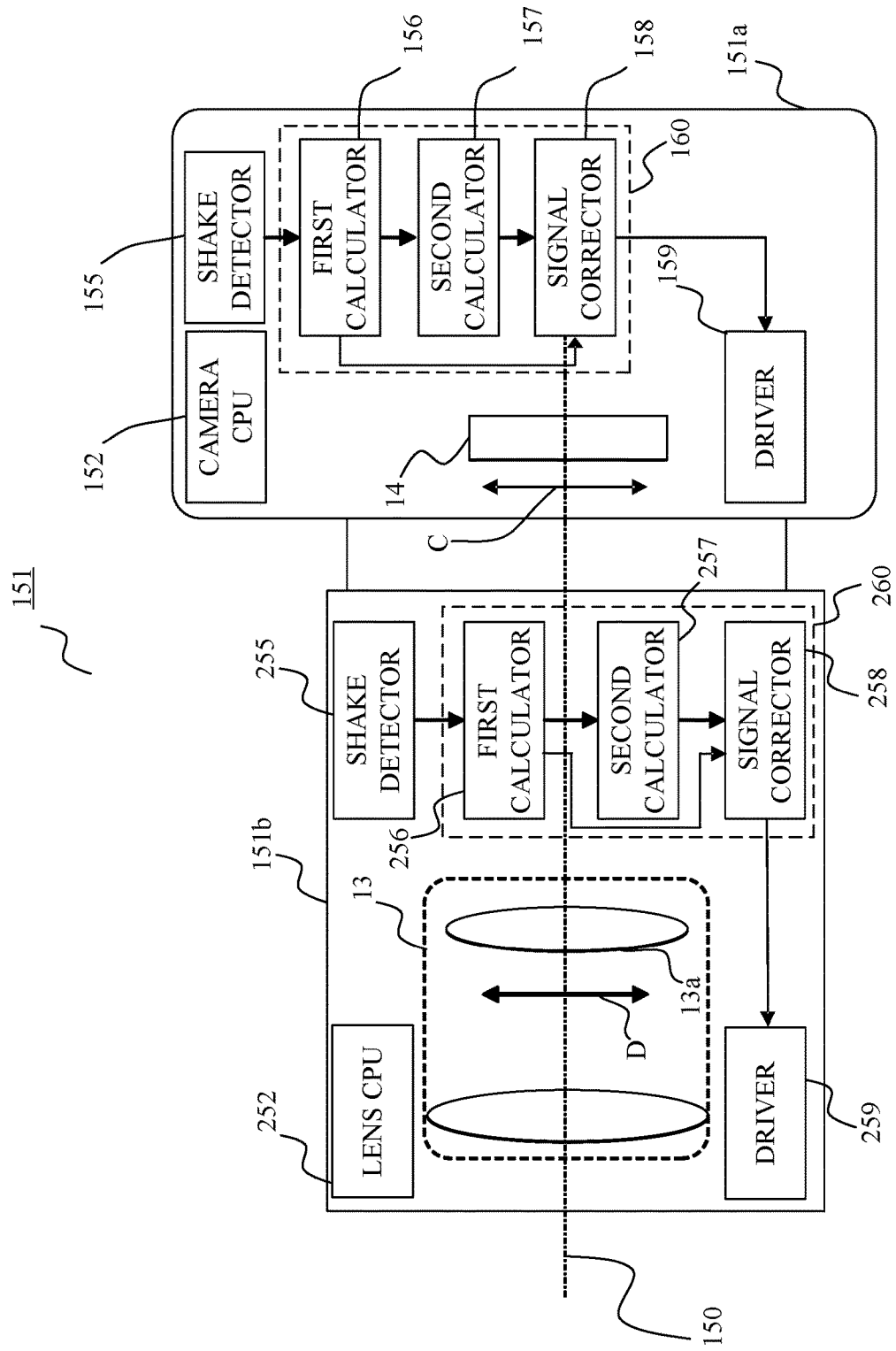
FIG. 15 is a block diagram of an optical apparatus according to a third embodiment.

FIG. 15 is a block diagram of a digital camera 151 which is an example of the optical apparatus according to this embodiment. The digital camera 151 includes a camera body 151a, and an interchangeable lens 151b that can be attached to and detached from the camera body 151a. The camera body 151a includes the image sensor 14, a camera CPU 152, a shake detector 155, a first calculator (first calculation task) 156, a second calculator (second calculation task) 157, a signal corrector (correction task) 158, and a driver 159. The interchangeable lens 151b includes the imaging optical system 13, a lens CPU 252, a shake detector 255, a first calculator (first calculation task) 256, a second calculator (second calculation task) 257, a signal corrector (correction task) 258, and a driver 259. In this embodiment, the image stabilizing apparatus 160 includes the first calculator 156, the second calculator 157, and the signal corrector 158. The image stabilizing apparatus 260 includes the first calculator 256, the second calculator 257, and the signal corrector 258. The digital camera 151 performs the image stabilization using the corrector 13a and the image sensor 14. The second calculator 157 has a low-pass filter 157a and a waveform estimator 157b, and the second calculator 257 has a low-pass filter 257a and a waveform estimator 257b. The orders of the low-pass filters 157a and 257a may be fixed similar to the first embodiment, or may be increased over time after the respective second calculators start similar to the second embodiment.

Figure 16:
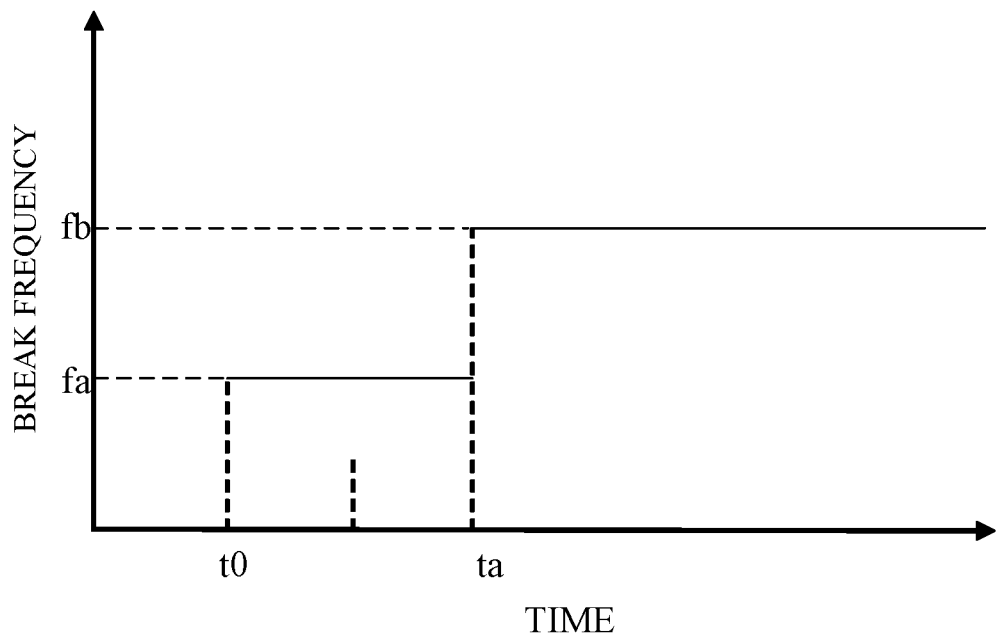
FIG. 16 illustrates changes in a break (or corner) frequency of the low-pass filter according to the third embodiment.

FIG. 16 illustrates a change of the break frequency (time constant) of the low-pass filter 157a (257a) over time after the shake detector 155 (255) starts. In FIG. 16, the abscissa axis represents time and the ordinate axis represents the break frequency. From the start time t0 of the second calculator 157 (257) to the first time ta (such as 2 seconds), the break frequency which is the offset extraction frequency is set to fa (such as 0.1 Hz). After the first time ta, the break frequency is set to fb (such as 0.05 Hz).

Figure 17:
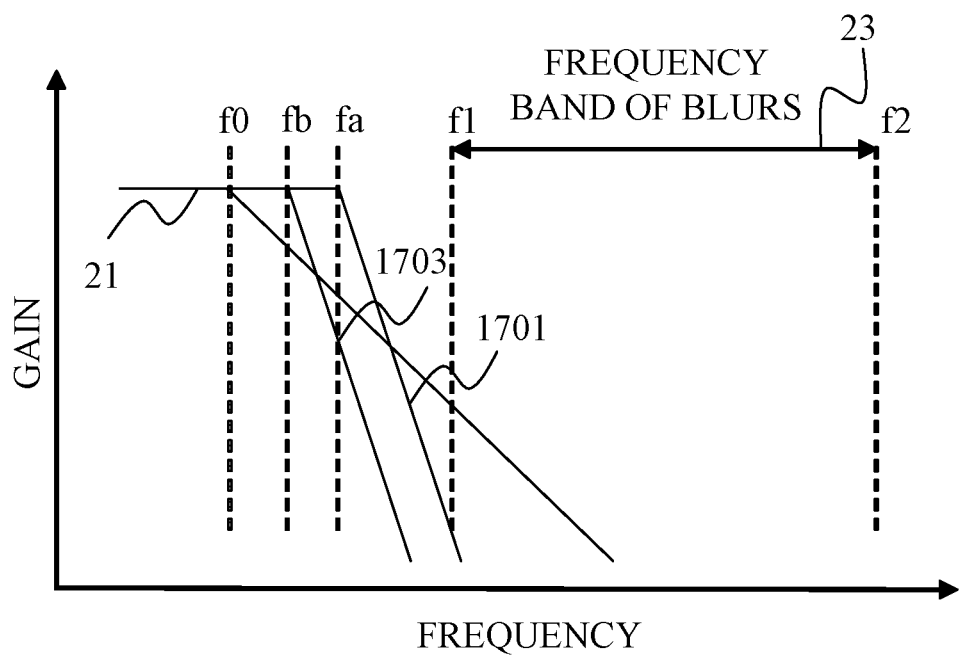
FIG. 17 explains a characteristic of a low-pass filter according to the third embodiment.

FIG. 17 explains the characteristic of the low-pass filter 157a (257a). In FIG. 17, the abscissa axis represents the frequency and the ordinate axis represents the output gain in the second calculator 157 (257). A characteristic 1701 has a high-frequency attenuation amount larger than that of a characteristic 1703. The offset variation value included in the output signal from the shake detector 155 (255) changes to the low-frequency side over time after the shake detector 155 (255) starts. This embodiment increases the time constant of the low-pass filter 157a (257a) in the second calculator 157 (257) (shifts the break frequency to the low-frequency side) over time after the shake detector 155 (255) starts, in order to extract the estimated value corresponding to the offset variation value with high accuracy.

Figure 18:
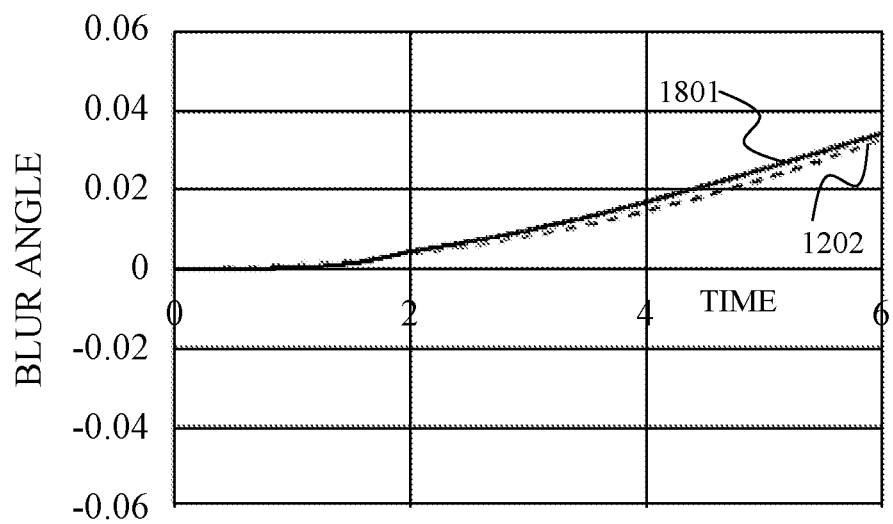
FIG. 18 illustrates a value corresponding to an extracted offset variation value according to the third embodiment.
Figure 19:
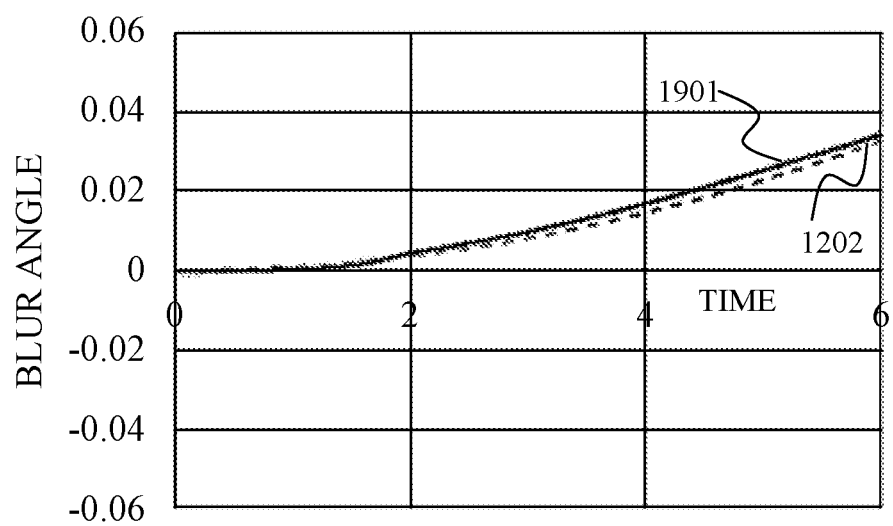
FIG. 19 illustrates an estimated value corresponding to the estimated offset variation value according to the third embodiment.

FIG. 18 illustrates a value corresponding to the offset variation value included in the output signal from the shake detector 155 (255), which is obtained by changing and extracting over time the time constant (break frequency) of the low-pass filter 157a (257a). An extracted value 1801 has a shape close to a value corresponding to an offset variation value 1202 included in the actual output signal from the shake detector 155 (255). As illustrated in FIG. 19, the waveform estimator 157b (257b) estimates an estimated value 1901 corresponding to the offset variation value during exposure using the extracted value 1801.

The signal corrector 158 (258) subtracts an estimated value 1901 from the output signal of the first calculator 156 (256), and drives the image sensor 14 (corrector 13) via the driver 159 (259) using the result as a target value for the image stabilization.

Figure 20:
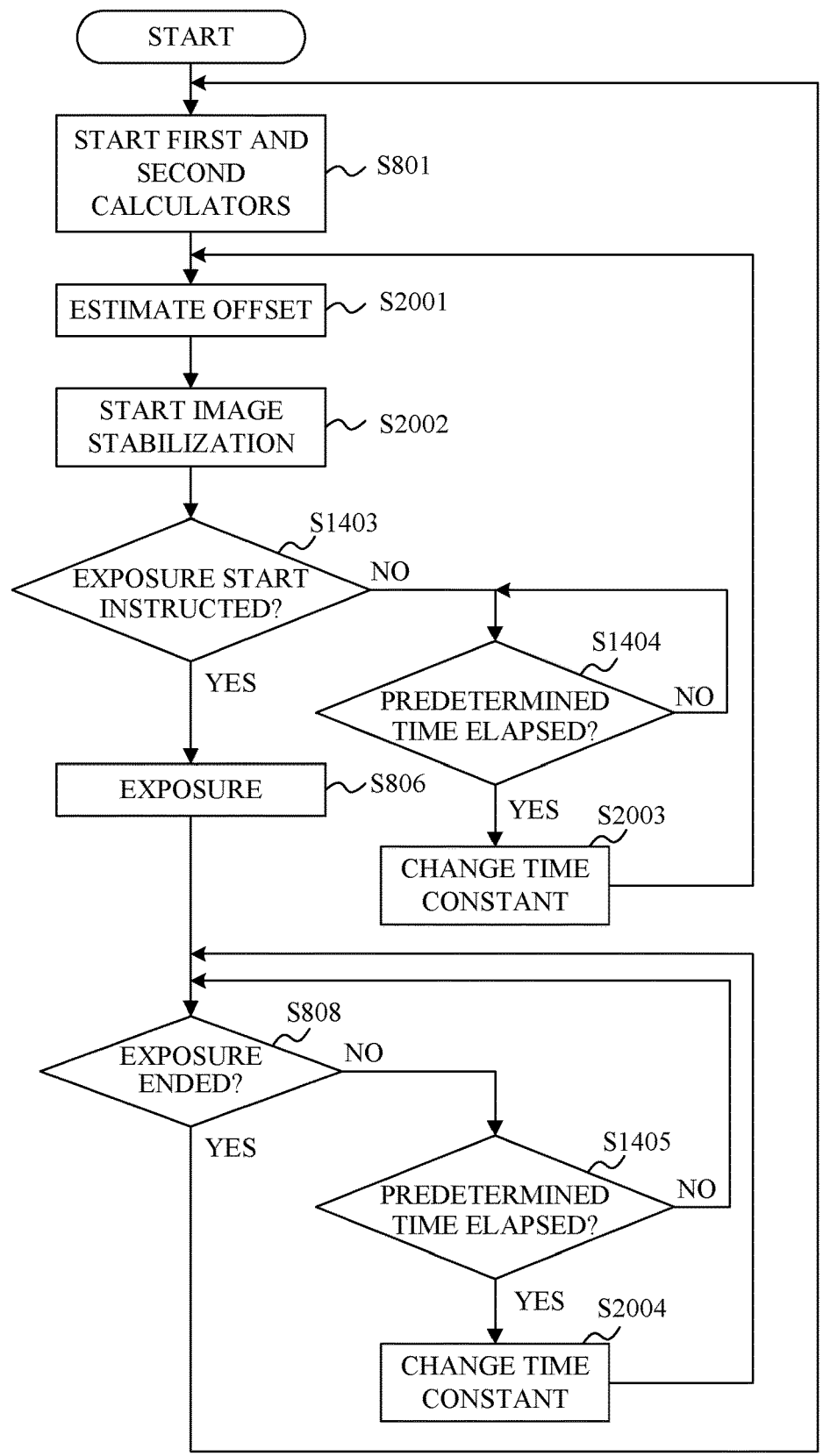
FIG. 20 is a flowchart illustrating processing of estimating an estimated value corresponding to an offset variation value according to the third embodiment.

FIG. 20 is a flowchart showing processing of estimating an estimated value corresponding to the offset variation value. This flow starts with the imaging preparation processing such as half-pressing a release switch provided on the camera body 151a. In FIG. 20, the steps for performing the same processing as those of the flows in FIGS. 8 and 14 are designated by the same reference numbers, and a detailed description thereof will be omitted.

In the step S2001, the waveform estimator 157b (257b) estimates the estimated value corresponding to the offset variation value using the signal processed by the low-pass filter 157a (257a). In the initial setting, the time constant (break frequency) of the low-pass filter 157a (257a) is set small (high).

In the step S2002, the signal corrector 158 (258) first subtracts the estimated value estimated in the step S2001 from the output signal from the first calculator 156 (256). Next, the signal corrector 158 (258) drives the image sensor 14 (corrector 13a) via the driver 159 (259) using the subtraction result (to start the image stabilization).

In the step S2003, the second calculator 157 (257) increases (decreases) the time constant (break frequency) of the low-pass filter 157a (257a).

In the step S2004, the second calculator 157 (257) increases (decreases) the time constant (break frequency) of the low-pass filter 157a (257a).

This embodiment changes the break frequency of the low-pass filter 157a over time after the second calculator 157 starts, and improves the estimation accuracy of the estimated value corresponding to the offset variation value included in the output signal from the shake detector 155. Similarly, this embodiment changes the break frequency of the low-pass filter 257a over time after the second calculator 257 starts, and thereby improves the estimation accuracy of the estimated value corresponding to the offset variation value included in the output signal from the shake detector 255.

As described above, the configuration of this embodiment can correct the image blurs with high accuracy, and reduce the offset variation in the output signal from the shake detector.

This embodiment provides the camera body 151a and the interchangeable lens 151b with the shake detectors 155 and 255, the first calculators 156 and 256, the second calculators 157 and 257, the signal correctors 158 and 258, and the drivers 159 and 259, respectively. However, the present invention is not limited to this embodiment, and the above units may be provided in either the camera body 151a or the interchangeable lens 151b similar to the first or second embodiment.

Fourth Embodiment

In the first to third embodiments, the blurs distributed in the frequency band 23 of the blurs are sufficiently attenuated by the low-pass filter having a high order, and only the value corresponding to the offset variation value included in the output signal from the shake detector is extracted. However, when the blur is very large, the blur component may be extracted as a value corresponding to the offset variation value. Accordingly, this embodiment sets the order of the low-pass filter 17a higher than that in each of the first to third embodiments.

The digital camera, which is an example of the image pickup apparatus according to this embodiment, has the same configuration as that of the digital camera 151 according to the third embodiment.

Figure 21:
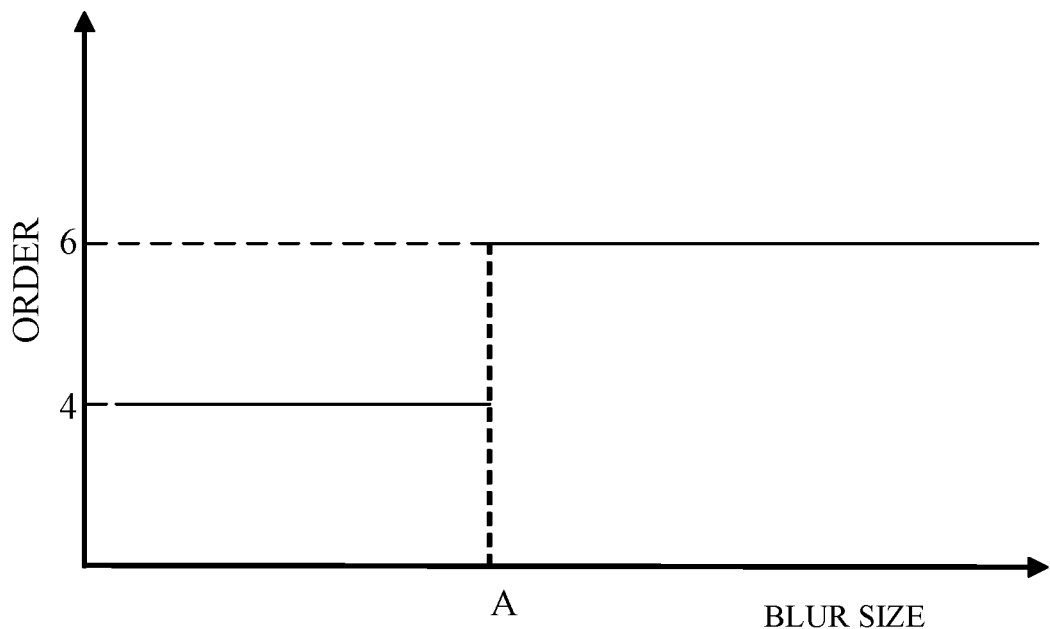
FIG. 21 explains the order of the low-pass filter according to a fourth embodiment.

FIG. 21 explains the order of the low-pass filter 157 (257) according to this embodiment. In FIG. 21, the abscissa axis represents the blur size and the ordinate axis represents the order. If the blur size is equal to or smaller than the predetermined amount A, the order is set to 4. If the magnitude of blur is equal to or larger than the predetermined amount A, the degree is set to 6.

Figure 22:
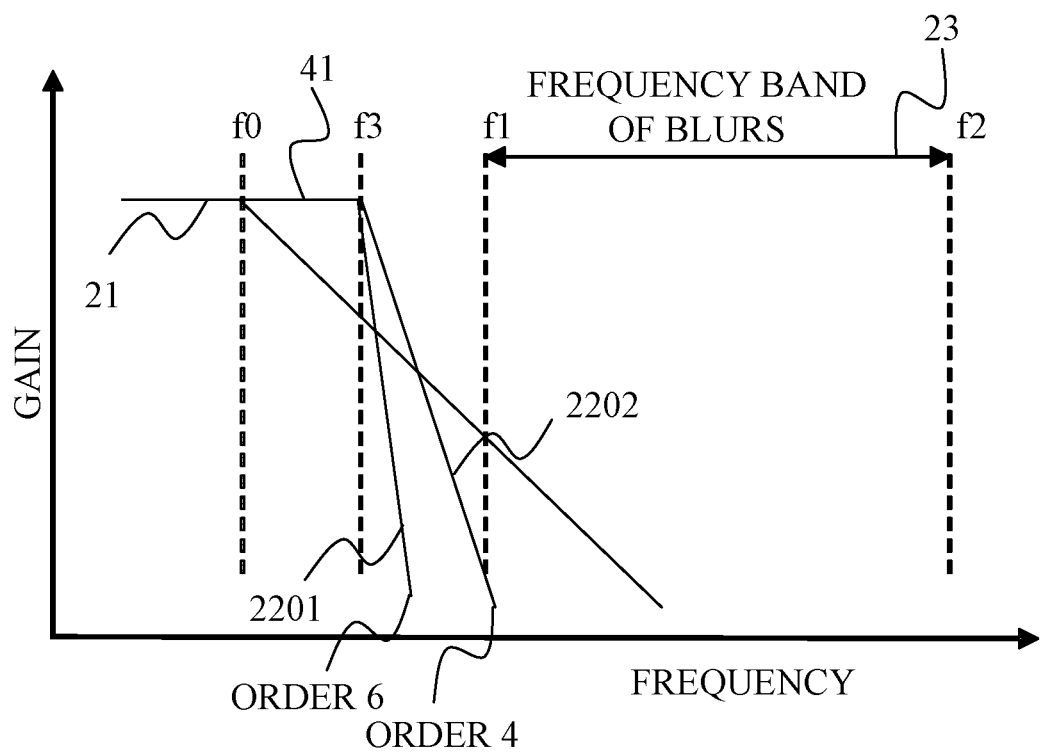
FIG. 22 explains a characteristic of the low-pass filter according to the fourth embodiment.

FIG. 22 explains the characteristic of the low-pass filter 157 (257) according to this embodiment. In FIG. 22, the abscissa axis represents the frequency and the ordinate axis represents an output gain in the second calculator 157 (257). The blur attenuation amount in the frequency band 23 of the blurs in the characteristic 2202 when the order is 6 is larger than that in the characteristic 2201 when the order is 4.

Figure 23:
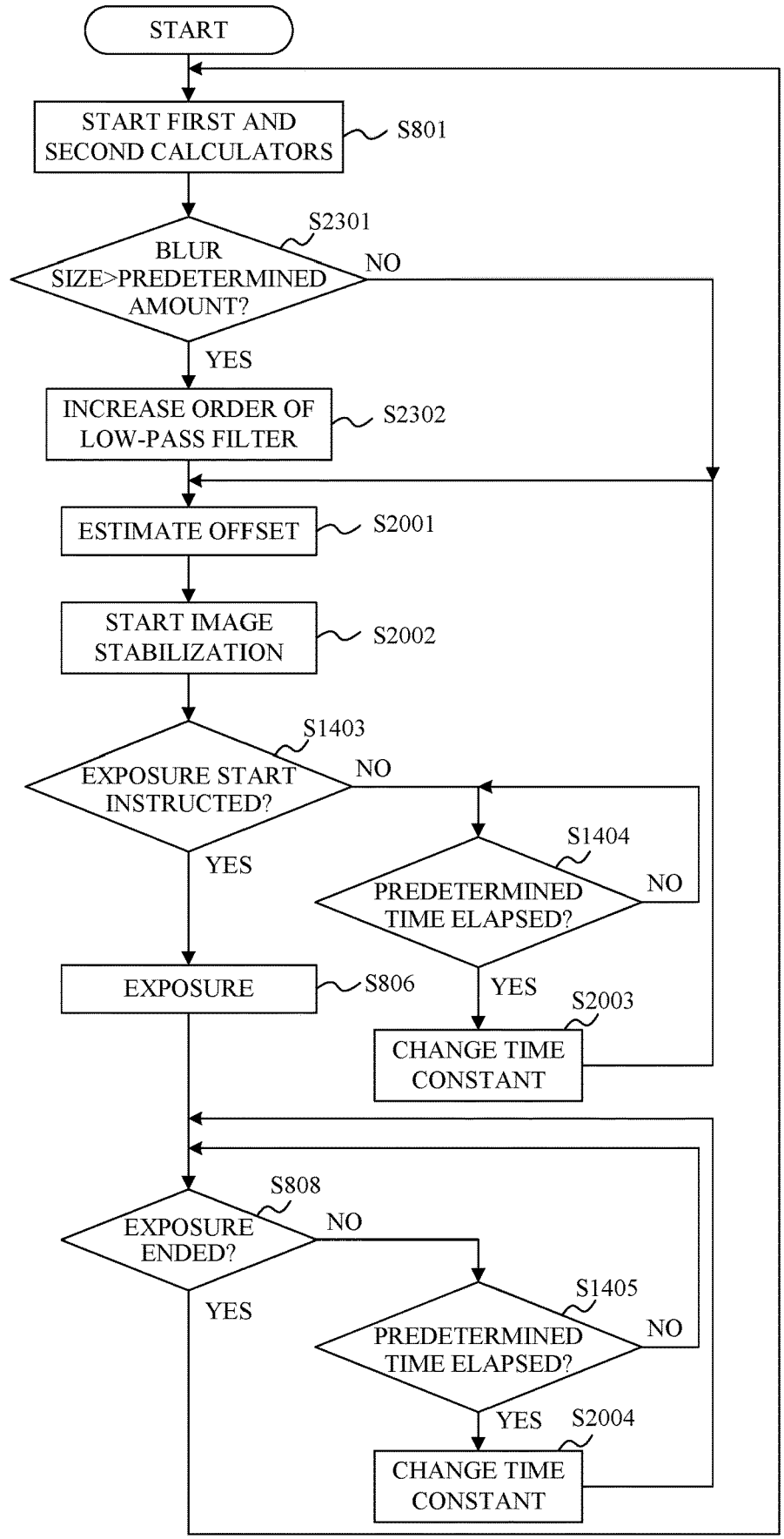
FIG. 23 is a flowchart showing processing of estimating an estimated value corresponding to an offset variation value according to the fourth embodiment.

FIG. 23 is a flowchart showing processing of estimating the estimated value corresponding to the offset variation value where the order is set based on the blur size. In the flowchart in FIG. 23, the processing of the steps S2301 and S2302 is added to the flowchart in FIG. 20.

In the step S2301, the camera CPU 152 (lens CPU 252) determines whether or not the blur amount is equal to or larger than a predetermined amount. The blur size can be determined by measuring the peak or bottom of the blur every predetermined time or by rectifying the blur waveform. If the blur size is equal to or larger than the predetermined amount (for example, if panning is made or framing is changed), the flow proceeds to the step S2302, and if the blur size is equal to or smaller than the predetermined amount, the flow proceeds to the step S2001.

In the step S2302, the second calculator 157 (257) increases the order of the low-pass filter 157a (257a).

As described above, in this embodiment, the second calculator 157 (257) changes the order of the low-pass filter 157a (257a) according to the blur size, and can reduce errors in extracting the value corresponding to the offset variation value caused by large blurs.

The second and third embodiments change the orders and time constants of the low-pass filters 97a, 157a, and 257a over time after the second calculators 97, 157, and 257 start, but may change them over time after the shake detectors 95, 155, and 255 start. Even when the first and second calculator are restarted due to panning or framing change, the shake detector starts before the panning or framing change. Therefore, in the panning or framing change, it is unnecessary to change the order of the low-pass filter or the time constant over time, and the calculation load can be saved.

The above embodiments can provide an image stabilizing apparatus and an optical apparatus having the same, each of which can correct image blurs with high accuracy and reduce an offset variation in an output signal from a shake detector.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154583, filed on Aug. 27, 2019, which is hereby incorporated by reference herein in its entirety.

What is claimed is:

1. An image stabilizing apparatus comprising:
   at least one processor or circuit configured to execute a plurality of tasks including:
      a first calculation task configured to make a calculation using an output signal from a shake detector configured to detect a shake;
      a second calculation task configured to estimate an estimated value corresponding to an offset variation value included in the output signal from the shake detector by using a signal processed by a low-pass filter having a high-frequency attenuation characteristic steeper than a high-frequency attenuation characteristic of the first calculation task; and
      a correction task configured to drive a corrector configured to correct an image blur caused by the shake using a calculation result of the first calculation task and the estimated value.

2. The image stabilizing apparatus according to claim 1, wherein a break frequency of the low-pass filter is set between the break frequency of the first calculation task and a lower limit frequency in a frequency band of the shake.

3. The image stabilizing apparatus according to claim 1, wherein the second calculation task sets a timing for estimating the estimated value according to an exposure time.

4. The image stabilizing apparatus according to claim 1, wherein the second calculation task changes a method for estimating the estimated value with over time after the shake detector starts.

5. The image stabilizing apparatus according to claim 1, wherein the second calculation task changes a method for estimating the estimated value over time after the second calculation task starts.

6. The image stabilizing apparatus according to claim 4, wherein the second calculation task changes a gain given to a slope in a signal processed by the low-pass filter over time.

7. The image stabilizing apparatus according to claim 4, wherein the second calculation task changes an order of the low-pass filter over time.

8. The image stabilizing apparatus according to claim 4, wherein the second calculation task changes a break frequency of the low-pass filter over time.

9. The image stabilizing apparatus according to claim 1, wherein the second calculation task changes an order of the low-pass filter according to a magnitude of the shake.

10. An optical apparatus comprising:
    an image stabilizing apparatus; and
    a corrector configured to correct an image blur caused by a shake,
    wherein the image stabilizing apparatus includes at least one processor or circuit configured to execute a plurality of tasks including:
       a first calculation task configured to make a calculation using an output signal from a shake detector configured to detect the shake;
       a second calculation task configured to estimate an estimated value corresponding to an offset variation value included in the output signal from the shake detector by using a signal processed by a low-pass filter having a high-frequency attenuation characteristic steeper than a high-frequency attenuation characteristic of the first calculation task; and
       a correction task configured to drive a corrector configured to correct an image blur caused by the shake using a calculation result of the first calculation task and the estimated value.

11. An image stabilizing method comprising the steps of:
    making a calculation using an output signal from a shake detector configured to detect a shake;
    estimating an estimated value corresponding to an offset variation value included in the output signal from the shake detector by using a signal processed by a low-pass filter having a high-frequency attenuation characteristic steeper than a high-frequency attenuation characteristic of the making step; and driving a corrector configured to correct an image blur caused by the shake using a calculation result of the making step and the estimated value.

* * * * *